Figure 1:
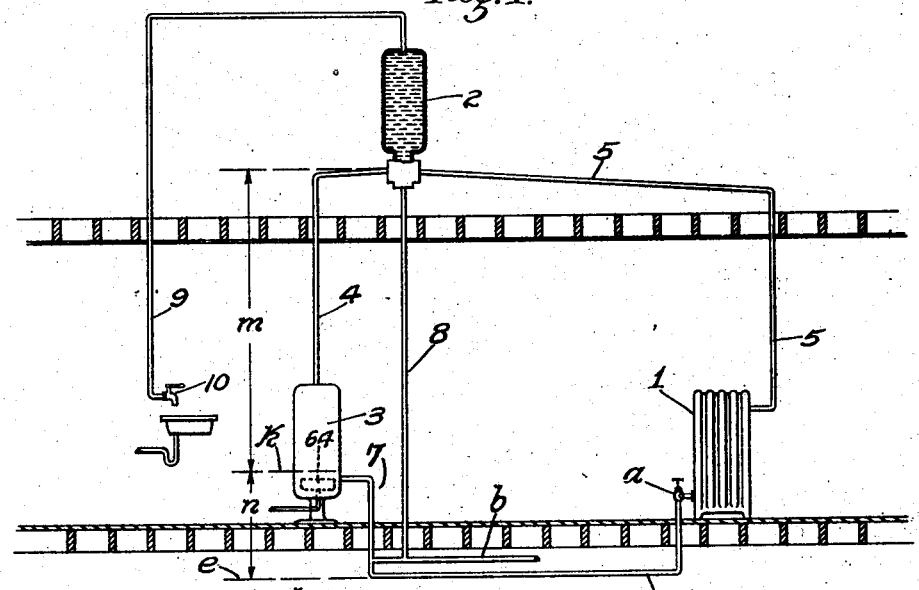

A. H. THOMPSON.
HOT WATER HEATING SYSTEM.
APPLICATION FILED OCT. 8, 1914.

1,246,681.

Patented Nov. 13, 1917.
4 SHEETS—SHEET 1.

Witnesses:
H. N. Kirkby
George H. Hiles

Inventor
Alfred H. Thompson
James R. Townsend
his atty.

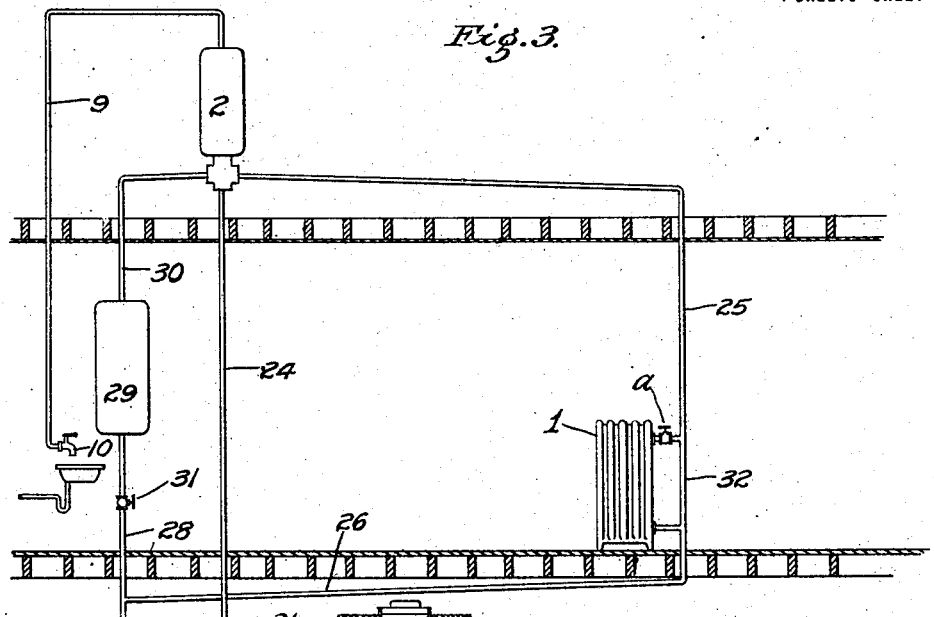
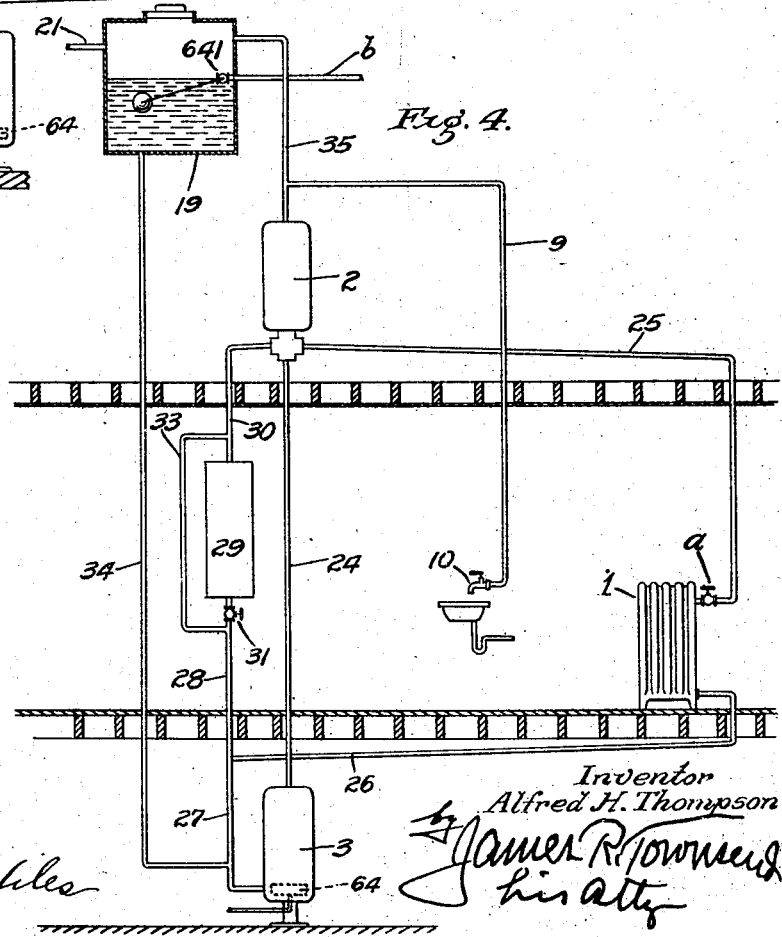

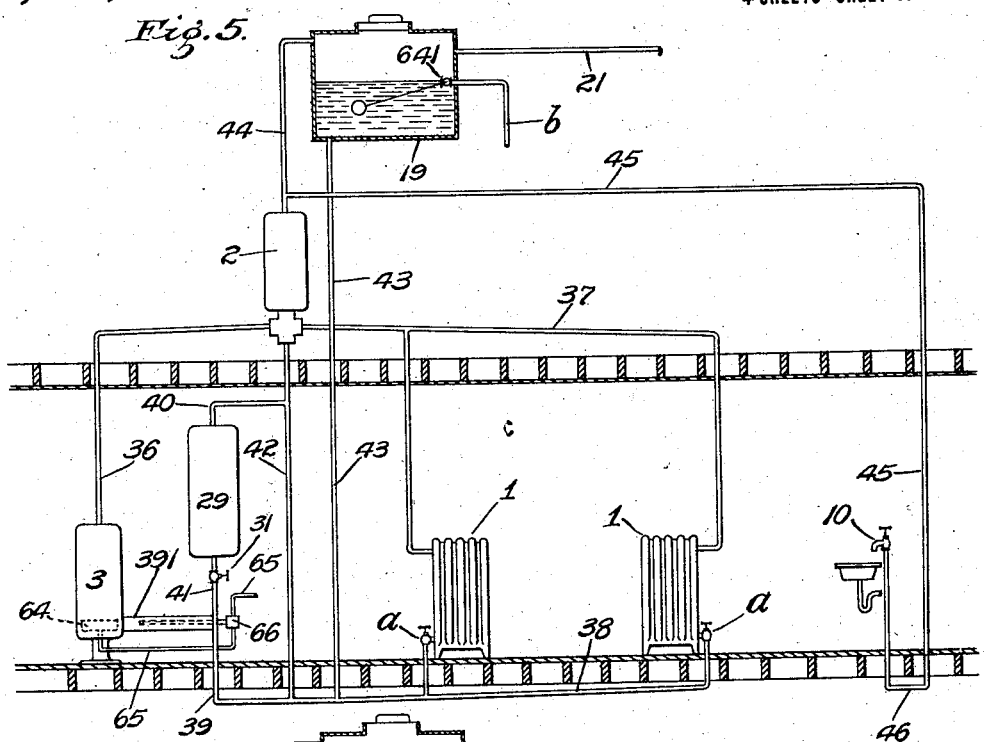
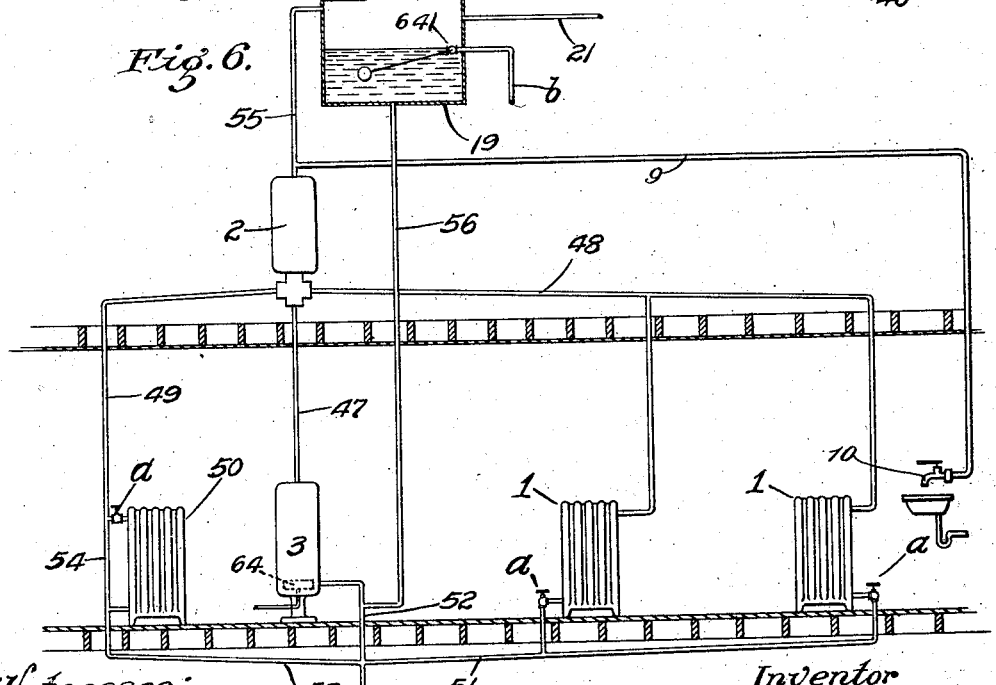

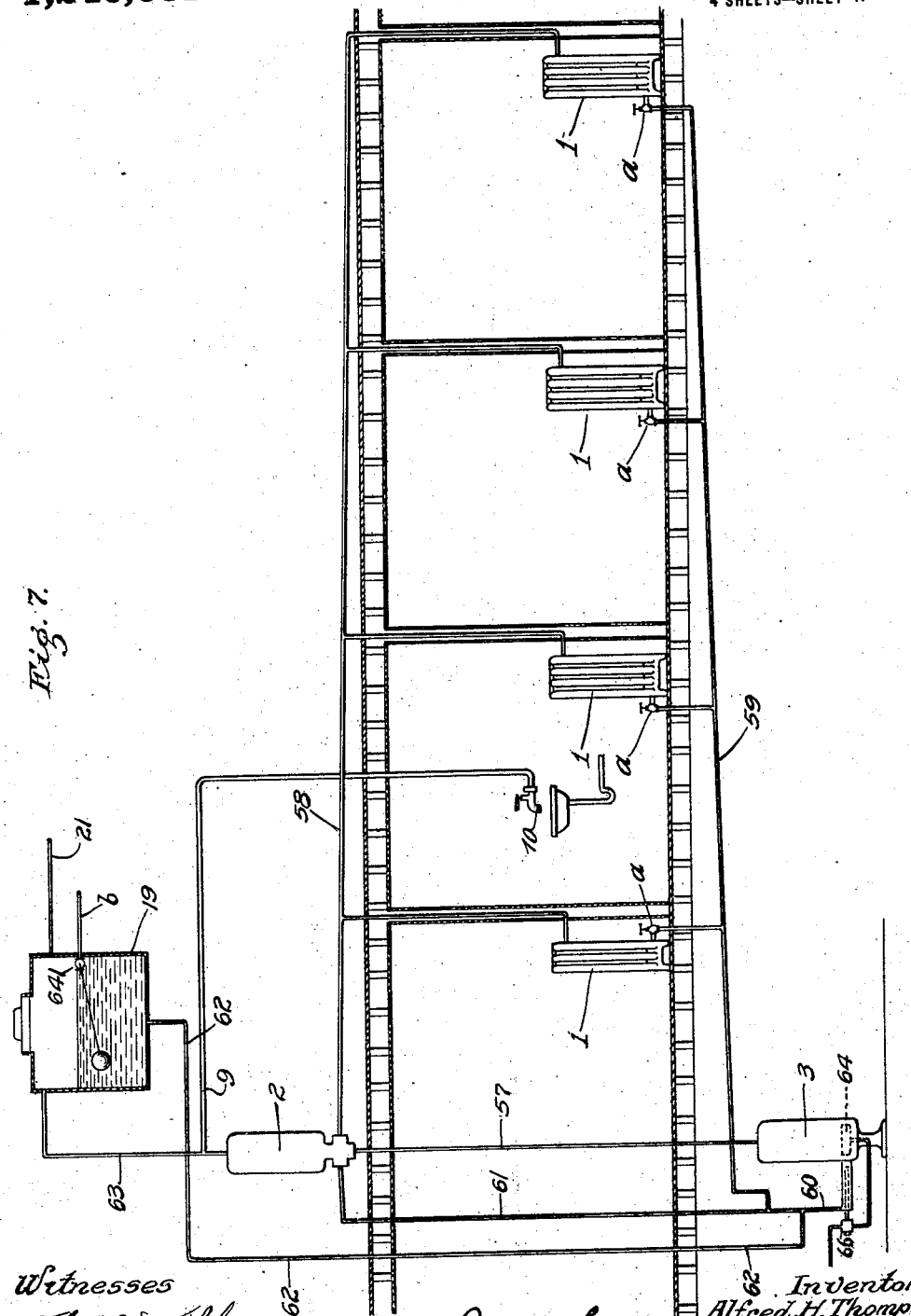

UNITED STATES PATENT OFFICE.

ALFRED H. THOMPSON, OF VENICE, CALIFORNIA.

HOT-WATER HEATING SYSTEM.

1,246,681.  Specification of Letters Patent.  Patented Nov. 13, 1917.

Application filed October 8, 1914. Serial No. 865,766.

*To all whom it may concern:*

Be it known that I, ALFRED H. THOMPSON, a citizen of the United States, residing at Venice, in the county of Los Angeles and State of California, have invented new and useful Improvements in Hot-Water Heating systems, of which the following is a specification.

An object of this invention is to heat and distribute water under appropriate pressure to radiators so as to heat the same without danger of blowing up the system and so as to insure against the heating system becoming air bound.

A difficulty to overcome in heating an apartment and the like by the ordinary hot water heating apparatus pertaining to that apartment alone is that it is necessary that there be circulation through the radiator when the apartment heating is in progress; and it has heretofore been regarded as impracticable to have the heater and radiator at substantially the same level with one another and at the same time avoid the formation of air pockets and dangerous pressures.

An object of this invention is to overcome such difficulty and to make a practical hot water heating system that will operate when wholly installed within the limits of a single story.

A principle of this invention is that there is provided an elevated distributer from which flows the heat to circulate through the radiator or radiators; and the invention may be extended so as to also supply hot water to the faucets for domestic use.

I have discovered that the heating system and the domestic hot water system may be combined provided that the heater, the radiator and the distributer are arranged in certain relations to each other so as to maintain proper circulation of heat and avoid the collection of air and steam in the pipes.

Another object of this invention is to make provision for perfect circulation of heat in the heating system by utilizing a distributer and a supply tank interconnected in such manner as to reduce the water pressure in some instances and increase the pressure in other instances from the pressure of the water supply main and at the same time insure the system against blowing up due to excessive pressures which otherwise would be caused owing to the fact that a given volume of water tends to increase as the water rises in temperature from say thirty-nine degrees to two hundred and twelve degrees Fahrenheit.

Circulation in a heating system is of paramount importance for without circulation there can be no distribution of heat from the source of heat to the radiating elements.

Hot water heating systems heretofore constructed are liable to become air bound so as to impede and often entirely destroy the circulation.

This invention is basic as regards the provision of a closed single-chambered distributer and as regards the provision of a domestic hot water supply pipe connected to the distributer so as to make a combined hot water domestic and heating system.

This invention is also basic as regards the provision of a relief or supply tank supplying water to the system.

The invention may be embodied in various ways and I have illustrated several practical embodiments.

The accompanying drawings illustrate different embodiments of the invention which I at present deem desirable.

Figure 1 comprises one embodiment of the invention having a radiator, a closed distributer, a heater at substantially the same level with the radiator and a hot water faucet.

Figure 2:
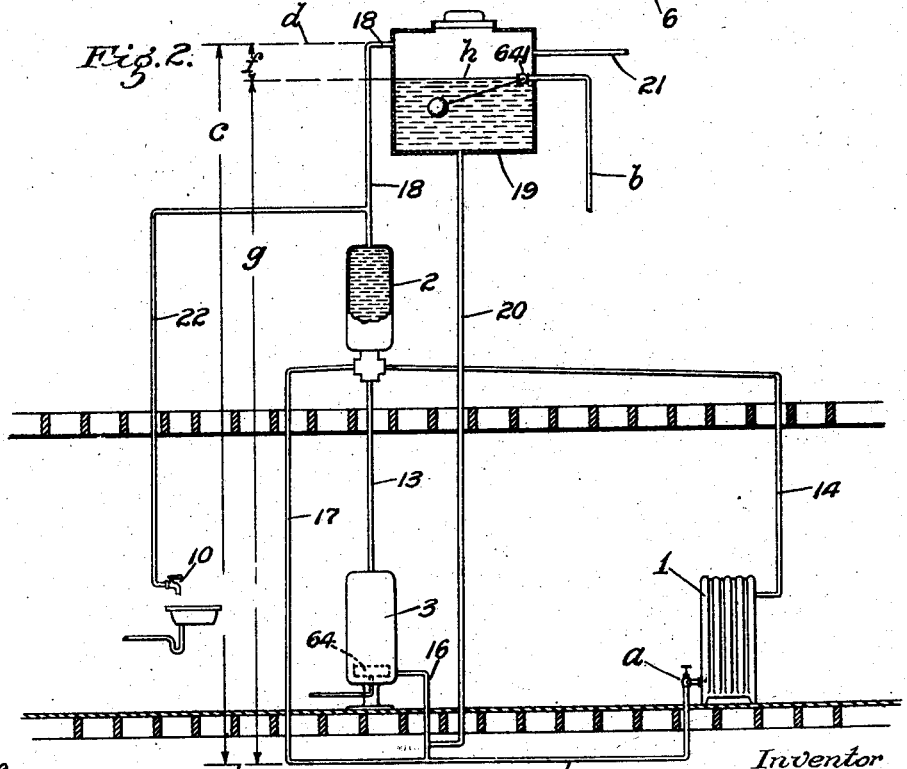

Fig. 2 comprises another embodiment of the invention having a radiator, a closed distributer, a heater at substantially the same level with the radiator, a hot water faucet, and a supply tank.

Fig. 3 comprises another embodiment of the invention having a radiator, a closed distributer, a heater below the level of the radiator, a hot water faucet and a domestic hot water tank.

Fig. 4 comprises another embodiment of the invention having a radiator, a closed distributer, a heater below the level of the radiator, a hot water faucet, a supply tank and a domestic hot water tank.

Fig. 5 comprises another embodiment of the invention having a radiator, a closed distributer, a heater at substantially the same level with the radiator, a hot water faucet, a supply tank and a domestic hot water tank, said hot water faucet being connected to the distributer by a pipe having a U-bend.

Fig. 6 comprises another embodiment of the invention having a radiator, a closed distributer, a heater at substantially the same level with the radiator, a faucet, and a supply tank.

Fig. 7 comprises still another embodiment of the invention having a radiator, a closed distributer, a heater below the level of the radiator, a faucet, and a supply tank.

Referring first to the structure common to the various embodiments shown in the different views, there is provided a radiator or radiators 1, a closed single-chambered distributer 2 above the level of said radiator and a heater 3 which may be substantially on the same level as the radiator as in Figs. 1, 2, 5 and 6 or may be at a lower level than the radiator as in Figs. 3, 4 and 7. The radiators are provided with valves $a$.

Water is supplied to the system through a water main $b$.

The distributer is of substantial capacity and forms an enlarged chamber capable of accommodating any accumulation of air or steam likely to occur in the system under the pressure of the water supply, and is likely to prevent such accumulation of air or steam from reaching the circuit and thereby stopping the circulation of water therethrough.

The radiator 1, distributer 2 and heater 3 are connected in what for convenience of description I term a radiator circuit or heating circuit, and the distributer 2 and heater 3 are connected in what for convenience of description I term a by-pass circuit or hot water circuit and said circuits are constructed in various ways in the different views and will now be described.

In Fig. 1 the heater 3 is connected to the distributer 2 by a riser pipe 4, the distributer 2 is connected to the radiator 1 by a drop pipe 5 and the radiator is connected to the heater by pipes 6 and 7, all of said pipes together with the heater, radiator and distributer forming the radiator circuit; also the distributer is connected to the pipe 7 by a return pipe 8, said pipes 4, 7, 8 together with the heater and distributer forming the non-shut-off by-pass circuit.

The distributer 2 is vented by reason of it being connected by a domestic hot water supply pipe 9 to a domestic cock or faucet 10.

From the foregoing it is clear that, supposing the heater 3 to be in commission, if it is desired to utilize the radiator circuit the valve $a$ will be opened so that hot water will circulate from the heater 3 through the pipe 4, distributer 2, pipe 5, radiator 1, pipes 6 and 7 and thence back to the heater 3; and that if it is desired to cut out the radiator circuit the valve $a$ will be closed, thus causing the hot water to circulate from the heater 3 through the pipe 4, distributer 2, pipes 8 and 7, and thence to the heater 3.

When it is desired to draw hot water for any purpose whatsoever the faucet 10 will be opened thus drawing hot water from the distributer 2 through the pipe 9, and if there is any steam or air that has collected in the top of the distributer, said steam or air will be drawn off through the faucet 10.

From the foregoing it is seen that perfect circulation is had at all times when the heater 3 is in commission, whether or not the radiator 1 is in commission owing to the open by-pass circuit and that there are no valves which must be operated in order to prevent blowing up of the system.

The embodiment of the invention shown in Fig. 1 is adapted to work satisfactorily at the same pressure as the pressure of water in the supply main $b$, and hereafter it will be shown how the pressure may be increased or decreased if the pressure in the supply main is too low for good circulation or is too high for safety of the system.

In Fig. 2 the heater 3 is connected by a riser pipe 13 to the distributer 2, said distributer is connected by a drop pipe 14 to the radiator 1 and said radiator is connected by pipes 15, 16 to the heater, all of said pipes together with the heater, distributer and radiator constituting the radiator circuit; and the pipe 16 is connected by a return pipe 17 to the distributer 2, said pipes 16 and 17 together with the pipe 13, the heater and the distributer constituting the non-shut-off by-pass circuit.

The distributer 2 is vented by a pipe 18 into a supply tank 19 which is above the level of the distributer and which is connected by a feed pipe 20 to the pipe 16 so as to supply the circuits with water.

Supply tank 19 is connected to the supply main $b$ leading from a suitable source of supply, not shown, and is provided with an overflow pipe 21 slightly below the level of the outlet end of the pipe 18.

The faucet 10 is connected by a pipe 22 to the vent pipe 18 and by said vent pipe is of course connected to the distributer 2.

From the foregoing it is clear that with the embodiment shown in Fig. 2, the heater 3 being in commission, when it is desired to utilize the radiator circuit the valve $a$ will be opened to allow hot water to circulate from the heater 3 through the pipe 13, distributer 2, pipe 14, radiator 1 and thence by pipes 15, 16 back to the heater 3; and that when it is desired to cut out the radiator circuit the valve *a* will be closed, thus causing hot water to circulate from the heater 3 through the pipe 13, distributer 2, and thence by pipes 17, 16 back to the heater 3.

Hot water will be drawn from the system by opening the faucet 10.

This embodiment of the invention is of advantage where it is necessary or desirable to either increase or decrease the pressure under which the system operates, for it is understood that ordinary radiators are built to withstand a maximum pressure of from ten to twenty pounds per square inch and in order to get good circulation it is well to utilize the maximum pressure which may be done by elevating the tank 19 a sufficient height for that purpose; also if the pressure in the water main is in excess of twenty pounds the pressure is relieved at the tank 19 which is provided with a float-valve 641 to automatically control the water supply from the main *b*.

In Fig. 3 the heater 3 is connected by a riser pipe 24 to the distributer 2, said distributer is connected by a drop pipe 25 to the radiator 1 and said radiator 1 is connected by pipes 26, 27 to the heater 3, all of said pipes together with the heater, the distributer and the radiator constituting the radiator circuit; and the heater is connected by said pipe 27 to a pipe 28 which in turn connects to a domestic hot water tank 29 that is connected by a pipe 30 to the distributer 2, said pipes 28 and 30 together with the pipes 24, 27, heater, distributer and hot water tank constituting the primary by-pass circuit. The pipe 28 is provided with a valve 31 and the hot water pipe 9 and faucet 10 are provided as in Fig. 1.

The pipes 25, 26, are not only connected to one another by the radiator 1 but are also connected by a by-pass pipe 32, said pipes 25, 26 and by-pass pipe 32 together with the pipe 27, heater 3, pipe 24 and distributer 2 constituting a secondary or non-shut-off by-pass circuit.

From the foregoing it is clear that, supposing the heater 3 to be in commission, if it is desired to utilize the radiator circuit the valve *a* will be opened so that hot water will circulate from the heater 3 through the pipe 24, distributer 2, pipe 25, radiator 1 and thence by pipes 26, 27 back to the heater 3, and that if it is desired to cut out the radiator circuit, considering that the valve 31 is open so as to supply the tank 29 with hot water, the valve *a* will be closed, thus causing the hot water to circulate from the heater 3 through the pipe 24, distributer 2, pipe 30, domestic tank 29 and thence by pipes 28, 27 back to the heater 3.

If it is desired to cut out the domestic tank 29 from the heater 3, the valve 31 will be closed and, if the valve *a* is open, circulation will then occur from the heater 3 through the pipe 24, distributer 2, pipe 25, radiator 1, and thence by pipes 26, 27 back to the heater.

If it is desired to cut out the radiator circuit and also cut out the domestic tank 29, both valves *a* and 31 will be closed and circulation will then be established from the heater 3 through the pipe 24, distributer 2, pipe 25, by-pass pipe 32, and thence by pipes 26, 27 back to the heater.

In Fig. 4 as in Fig. 3 just described, the heater 3 is connected by pipe 24 to the distributer 2, said distributer 2 is connected by the pipe 25 to the radiator 1, and said radiator is connected by pipes 26, 27 to the heater, said pipes together with the heater, distributer and radiator constituting the radiator circuit; also, as in Fig. 3, the heater is connected by the pipe 27 to the pipe 28 which in turn connects to the domestic tank 29 that is connected by the pipe 30 to the distributer 2, said pipes 24, 30, 28, 27 together with the heater, distributer and domestic tank constituting the primary by-pass circuit.

Additionally, in Fig. 4 the pipes 28 and 30 are connected to one another not only by the domestic tank 29 but are also connected by a by-pass pipe 33, said pipes 24, 30, 28, 27 and by-pass pipe 33 together with the heater and distributer constituting a secondary or non-shut-off by-pass circuit; also the pipe 27 is connected by a pipe 34 to the supply tank 19, said supply tank being connected by a vent pipe 35 to the distributer 2.

The hot water supply pipe 9 is connected by means of the pipe 35 to the distributer 2.

From the foregoing it is clear that, supposing the heater 3 to be in commission, if it is desired to use the radiator circuit, the valve *a* will be opened so that hot water will circulate from the heater 3 through the pipe 24, distributer 2, pipe 25, radiator 1, and thence by pipes 26, 27 back to the heater; and that if it is desired to cut out the radiator circuit and to supply hot water to the domestic tank 29 the valve *a* will be closed and the valve 31 will be opened, thus causing hot water to circulate from the heater 3 through the pipe 24, distributer 2, pipe 30, domestic tank 29, and thence by pipes 28, 27 back to the heater; and also if it is desired to cut out both the radiator circuit and domestic tank, both valves *a* and 31 will be closed, causing circulation of the hot water to then take place from the heater 3 through the pipe 24, distributer 2, pipe 30, by-pass pipe 33, thence by pipes 28, 27 back to the heater.

In Fig. 5 the heater 3 is connected by a pipe 36 to the distributer 2, said distributer is connected by a pipe 37 to a radiator or radiators 1 and said radiator or radiators are connected by pipes 38, 39, 391 to the heater, said pipes together with the heater, distributer and radiator constituting the radiator circuit; also the distributer is connected by a pipe 40 to the domestic tank 29 and said domestic tank is connected by a pipe 41 to the pipe 391 and through the agency of said pipe 391 to the heater 3, said pipes 40, 41 together with the pipes 36, 391, heater, distributer and domestic tank constituting the primary by-pass circuit.

The distributer 2 and pipe 38 are not connected together only by the pipes 39, 40, 41 and domestic tank 29 but are also connected by a by-pass pipe 42. The pipes 36, 39, 391 together with said by-pass pipe 42, heater 3 and distributer 2 constitute the secondary or non-shut-off by-pass circuit.

The pipe 39 is connected by a pipe 43 to the supply tank 19 which is connected by a vent pipe 44 to the distributer 2, said vent pipe being connected by a pipe 45 having a U-bend 46 to the faucet 10.

The operation of the embodiment of the invention shown in Fig. 5 is clear from the foregoing described operations of the previously described embodiments.

In Fig. 6, the heater 3 is connected by a pipe 47 to the distributer 2, said distributer 2 is connected by a pipe 48 to a radiator or radiators 1 and by a pipe 49 to another radiator 50, said radiators 1 being connected by pipes 51, 52 to the heater and said radiator 50 being connected by a pipe 53 and by said pipe 52 to the heater; the pipes 47, 48, 51, 52 together with the heater, distributer and radiators 1 constituting the radiator circuit, and the pipes 47, 49, 52, 53 together with the heater, distributer and radiator 50 constituting the primary by-pass circuit.

The pipes 49 and 53 are connected together not only by the radiator 50 but are also connected by a by-pass pipe 54, the pipes 47, 49, 52, 53 together with said by-pass pipe 54, the heater and distributer constituting the secondary or non-shut-off by-pass circuit.

The distributer 2 is vented by a pipe 55 connected to the upper part of the supply tank 19 which is connected by a feed pipe 56 to the pipe 52.

From the foregoing it is clear that, supposing the heater 3 to be in commission, if it is desired to heat the radiator or radiators 1, the valve or valves $a$ will be opened so that hot water will circulate from the heater 3 through the pipe 47, distributer 2, pipe 48, radiator or radiators 1, and thence by pipes 51, 52 back to the heater; and if it is desired to cut out the radiator circuit the valve or valves $a$ will be closed, thus causing the hot water to circulate from the heater 3 through the pipe 47, distributer 2, pipe 49, radiator 50, if the valve $a$ of said radiator is open, thence by pipes 53, 52 back to the heater; it being clear that if it is not desired to heat the radiator 50 the valve $a$ will be closed, thus establishing the circuit by way of the by-pass 54.

In Fig. 7 the heater 3 is below the level of the radiators 1 and is connected by a pipe 57 to the distributer 2, and said distributer is connected by a pipe 58 to the radiator or radiators 1, and said radiator or radiators are connected by pipes 59, 60 to the heater, said pipes together with the heater, distributer and radiator or radiators constituting the radiator circuit; also the distributer 2 is connected by a pipe 61 and the pipe 60 to the heater, said pipes 60, 61 together with the pipe 57, heater and distributer constituting the non-shut-off by-pass circuit.

The pipe 60 is connected by a pipe 62 to the bottom of the supply tank 19 which is connected by a vent pipe 63 to the distributer 2.

The operation of the embodiment of the invention disclosed in Fig. 7 is readily understood from the preceding description of the operation of the other embodiments hereinbefore described.

Referring particularly to Fig. 2 as a type of the several forms shown in Figs. 2, 4, 5, 6 and 7 it may be assumed that before the burner 64 is started into operation, the water throughout the system may be of the same temperature as when it was admitted; say 39° F., for best example; that being the temperature of greatest density. In such case, it is evident the water level in supply tank 19 would be at the ball float $b'$ of supply valve 641 and not at the level indicated at $h$. Since the float in the position shown holds the float valve closed, any expansion of the water that might occur must be accommodated by raising the level of the water in vent pipe 18 and tank 19.

There is free communication at all times through supply pipe 20 and pipe 16, between the supply tank 19 and the heater 3; and it is evident that any expansion of water in heater 3, pipe 13, distributer 2 and pipe 18 and any other part of the system to which the hot water from the heater 3 flows, will result in a rise of the water level in the vent pipe 18, and that such rise of the water level in vent pipe 18 will result in a rise of the water level in supply tank 19. It is seen that the initial rise of the water level in supply tank 19 from the level of the float $b'$ to the level $h$, is due solely to the counterbalancing weight of the water in vent pipe 18, and may occur while the water in tank 19 and pipe 20 remains at the assumed initial temperature of 39° F.

Since the water in pipe 13, distributer 2, vent pipe 18 and the portions of the system receiving hot water from pipe 13 is of less density than the water in the supply tank 19 and supply pipe 20, the water will stand in vent pipe 18 at a higher level than in tank 19. Consequently, to prevent flow from pipe 18 into tank 19, the vent 18' from vent pipe 18 into the supply tank 19 must be sufficiently high above the counter-balancing water level $h$ to more than account for the difference in specific gravity of the two columns of water represented by tank 19 and pipe 20 on the one side and the heater 3, pipe 13, distributer 2 and vent pipe 18 on the other side. That is to say, if the vent 18' from pipe 18 into the supply tank 19 were at the level $h$ a water circulation would be established from the heater through pipe 13, distributer 2, and pipe 18, before the level $h$ was reached in tank 19, so that the water in said tank would be heated directly from the heater through pipe 18. A purpose of this invention is to avoid such a result.

It is well understood that the column of denser water in tank 19 and pipe 20 will balance a water column of less density and greater height depending on the difference in specific gravity of the two columns, irrespective of their volumes.

In constructing the system as suggested in Figs. 2, 4, 5, 6 and 7, care should be taken that the vertical distance $c$, Fig. 2, from the highest water level $d$ of the system to the lowest water level $e$ of the system exceeds by height $f$ the vertical distance $g$ from the supply tank expanded water level $h$ to said lowest water level $e$; and in practice the height $f$ is made greater than $$\frac{g}{23.462};$$

that is to say, for instance, if the distance $g$ is approximately 23 feet, then $f$ is made somewhat more than one foot so as to provide for the difference between the height of the hotter leg of water extending from the heater level $k$ to the highest water level $d$ and that of the colder leg of water extending from the expanded water level $h$ to the heater level $k$. This is necessary to avoid venting hot water into the supply tank. Said difference in height is determined by the difference in densities, at sea level of hot water at 212° Fahrenheit and cold water at 39° F.

For illustration of a practical rule for constructing a system such as illustrated in Fig. 2, etc., it may be assumed that the mean temperature of the hot leg would be 160° F. and the mean temperature of the cold leg would be 60° F. In such case the height of the expanded column would be 23.462 feet, the difference between the expanded level in the vent pipe and the expanded level in the expansion tank would be 100/173 of one foot or 6.93+ inches.

When the water flowing from the heater is nearly boiling hot, the vertical distance $c$ from the highest water level $d$ of the system to the lowest water level $e$ of the system exceeds by a height $f$ the vertical distance $g$ from the supply tank water level $h$ to said lowest water level $e$; and, in practice, if the distance $g$ is approximately twenty-three feet, then $f$ is somewhat more than one foot.

Furthermore it is noted that the heater 3 and radiator 1 are connected in circuit and that the lower part of the supply tank 19 is connected to said circuit at approximately the lowest level of said circuit and that the upper part of said supply tank is connected through the distributer 2 to said circuit at the highest level of said circuit.

From the foregoing it is clear that when the cold water is turned into the system, said water will rise in said system until it reaches the highest level in said system; and that air cannot possibly be entrapped in any portion of the system so as to produce a break in the thermal conductivity of the system; and that after the system is filled with water such break cannot occur; and also that pressure cannot occur in excess of the pressure predetermined for the system by the elevation of the supply tank above the lowest water level $e$ of the system.

I have discovered that it is important that the distributer 2 be elevated above the water level $k$ in the heater of the system by a distance $m$ equal to or greater than twice the distance $n$ from the water level $k$, Fig. 1, to the lowest water level $e$ because of the difference between the density of the mass of water and air extending from the distributer 2 at the highest water level of the circuits to the heater level $k$ and the density of the mass of water extending from said heater level to the lowest water level $e$ of the circuits so as to obtain maximum circulation. For instance if the distance $n$ from the heater level $k$ to the lowest water level $e$ is assumed to be ten feet, then the distance $m$ from said heater level $k$ to the distributer 2 should not be less than twenty feet but is preferably made as much greater than twenty feet as is convenient.

In Fig. 5 gas is supplied to the burner 64 through a pipe 65 controlled by a thermostatic valve 66 of any well known or preferred construction and said valve may be set so that when water which passes through the pipe 391 reaches a certain predetermined temperature the gas supplied through the pipe 65 will be shut off leaving only a small flame as a pilot light, not shown, at the burner to maintain the fire, it being understood that when the temperature of the water becomes lower the gas is turned on by the automatic action of the thermostatic valve to maintain the requisite temperature.

In Figs. 2, 4, 5, 6, 7 the overflow pipe 21 is sufficiently above the level of the water supply main *b* to allow for expansion of the volume or mass of water and air in the supply tank 19 and the pipes leading to said tank, the volume at say 212° Fahrenheit at sea level being approximately one twenty-third greater than the volume at 39° Fahrenheit.

The water level in the supply tank 19, Figs. 2, 4, 5, 6, 7 is governed by the float-valve 641 at the discharge end of the water supply main *b*.

By the term heater level I mean the lowest point at which the heat is applied to the water in the heater. In the drawings the same is indicated as being slightly above the level of the top of the burner 64. Such point is at the lowest coil the heat is applied to in coil heaters.

I claim:—

1. In a combined hot water domestic and heating system the combination of a hot water circuit including a closed distributer of substantial capacity, a heater and a radiator; the distributer being situated above the level of the heater; a service cock; a pipe leading from the top of said distributer to said service cock; and a supply pipe for the system; said supply pipe being adapted to produce pressure in the distributer and said distributer forming an enlarged chamber of substantial capacity capable of accommodating any accumulation of air or steam likely to occur in the system under the pressure of the water supply, and to prevent such accumulation of air or steam from reaching the circuit and thus stopping the circulation of water through the heating system, the pressure in said distributer operating to force the water through said service cock.

2. A hot water system comprising a radiator circuit having a valve, a by-pass circuit connected to said radiator circuit, both of said circuits including a distributer of substantial capacity closed against pressure and located at the highest point in said circuits, a water supply main for the system, and a faucet connected to the upper part of the distributer.

3. In combination, a heater, a closed distributer above the level of said heater, a valved radiator, a supply tank connected to a water supply main, a pipe connecting said heater to said distributer, another pipe connecting the distributer to the radiator, other pipes connecting the radiator and the supply tank and the distributer to the heater, a vent pipe connecting the distributer to the upper part of the supply tank, and a faucet connected to the vent pipe.

4. In combination, a heater, a closed distributer above the level of the heater, a valved radiator, a domestic tank, a supply tank connected to a water supply main, a pipe connecting the heater to the distributer, another pipe connecting the distributer to the radiator, other pipes 26, 27 connecting the radiator to the heater, a pipe 28 connecting the pipe 27 to the domestic tank, another pipe 30 connecting the domestic tank to the distributer, a by-pass pipe connecting the pipe 28 to the pipe 30, another pipe connecting the pipe 27 to the supply tank, a vent pipe connecting the distributer to the supply tank, and a faucet connected to the vent pipe.

5. In combination, a heater, a closed distributer above the level of said heater, a valved radiator, a supply tank connected to the water supply main, a float valve for controlling the water supply, a pipe connecting said heater to said distributer, another pipe connecting the distributer to the radiator, other pipes connecting the radiator and the supply tank and the distributer to the heater, a vent pipe connecting the distributer to the upper part of the supply tank, and a faucet connected to the vent pipe.

In testimony whereof, I have hereunto set my hand at Los Angeles, California, this 29th day of September, 1914.

ALFRED H. THOMPSON.

In presence of—
JAMES R. TOWNSEND,
GEORGE H. HILES.

Copies of this patent may be obtained for five cents each, by addressing the "Commissioner of Patents, Washington, D. C."